April 2, 1957 M. COHEN ET AL 2,787,311
VEHICLE COVER

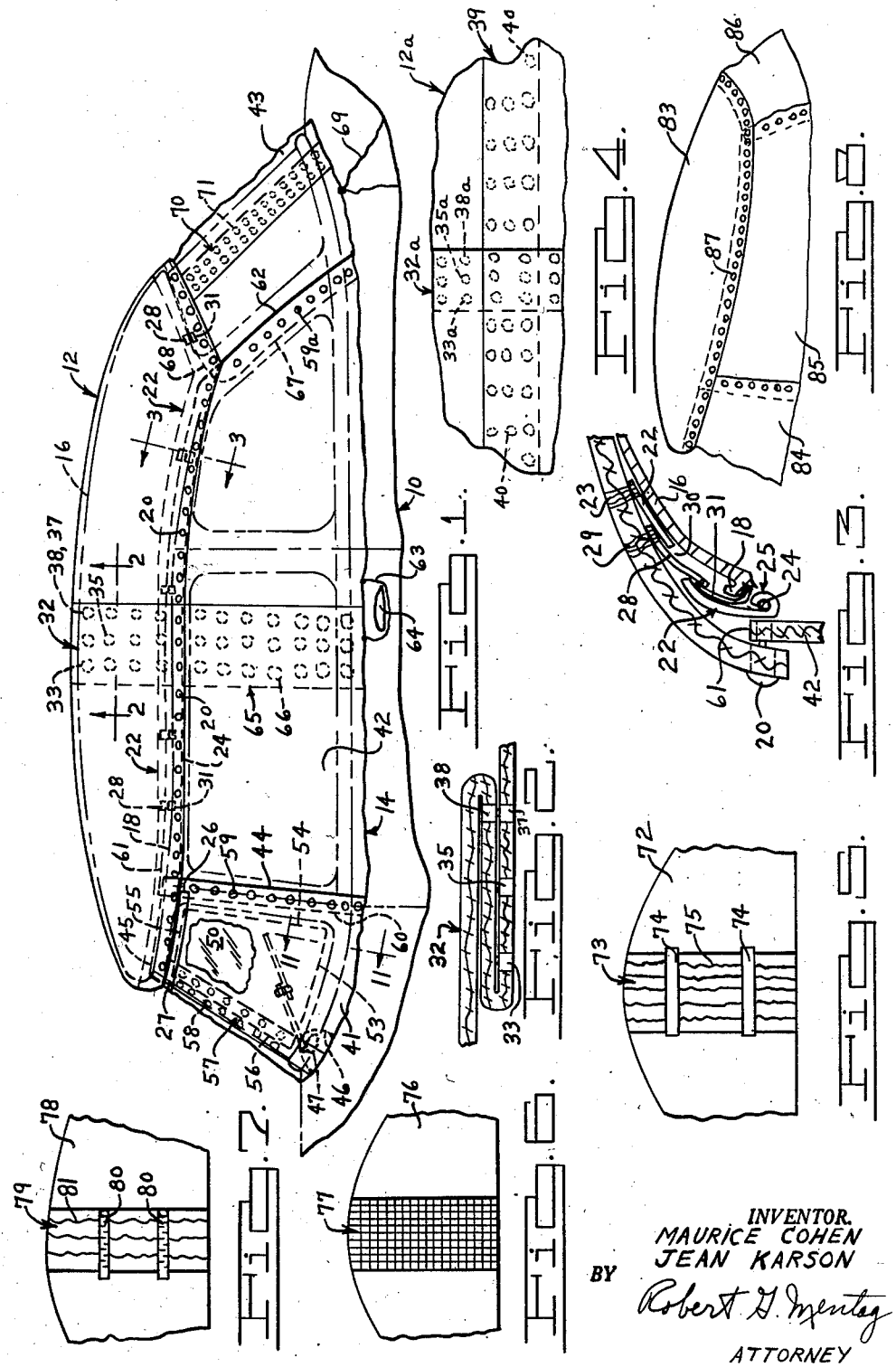

Filed Jan. 26, 1956 2 Sheets-Sheet 2

INVENTOR.
MAURICE COHEN
JEAN KARSON
BY
Robert G. Mentag
ATTORNEY

United States Patent Office 2,787,311
Patented Apr. 2, 1957

2,787,311

VEHICLE COVER

Maurice Cohen and Jean H. Karson, Detroit, Mich.

Application January 26, 1956, Serial No. 561,603

16 Claims. (Cl. 150—52)

This invention relates to a vehicle cover especially adapted to form a protective enclosure for the top and/or window areas of a vehicle from the adverse effect of the elements, such as snow, sleet, rain and the sun, and, which cover may be quickly and easily mounted on, and removed from a vehicle.

The vehicle cover disclosed in this application is an improvement on the vehicle covers illustrated in our copending applications, No. 515,318, filed on June 14, 1955, and, No. 521,458, filed on July 12, 1955.

It is an object of this invention to provide a vehicle protective cover comprising: a first part which is adapted to be detachably mounted directly on the outer surface of the top of a vehicle; said first part being arranged and constructed so as to be extensible, to fit different size vehicles, and which is adapted for use when the vehicle is either parked or moving, and which is provided with a fluid storage means for storing a fluid adapted to provide a cooling effect on the top of the vehicle; a second part which is adapted to be detachably connected to the front, rear and side window areas of the vehicle, for covering the window areas of the vehicle, and which is arranged and constructed so as to be extensible or enlargeable, to fit different size vehicles; said second part including a plurality of separate portions; and, said first and second parts being adapted for either combined or separate use.

It is another object of this invention to provide a vehicle protective cover of the class described which may be made from any suitable water-proof and flexible, lightweight material, such as plastic, canvas, and the like, and which may be shaped according to the particular vehicle on which it is to be used, and which may be made with extensible portions so as to permit the cover to be used on different size vehicles.

It is still another object of this invention to provide a multi-part vehicle protective cover for the top and window areas of a vehicle in which the parts are arranged and constructed to permit extension thereof, as desired and needed, so as to conform to the particular size and shape vehicle to which the cover is applied.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is a fragmentary side elevational view of a vehicle provided with a protective cover made in accordance with the principles of the invention;

Fig. 2 is an enlarged fragmentary elevational sectional view of the structure illustrated in Fig. 1, taken along the line 2—2 thereof;

Fig. 3 is an enlarged fragmentary elevational sectional view of the structure illustrated in Fig. 1, taken along the line 3—3 thereof;

Fig. 4 is an enlarged fragmentary plan view of a central portion of the top part of a vehicle protective cover provided with transverse and longitudinal extensible portions;

Fig. 5 is a fragmentary plan view of a top part of a vehicle protective cover provided with an extensible portion including strips of elastic material;

Fig. 6 is a fragmentary plan view of a top part of a vehicle protective cover provided with an extensible portion made entirely of elastic material;

Fig. 7 is a fragmentary plan view of a top part of a vehicle protective cover provided with an extensible portion including extensible zippers;

Fig. 8 is a fragmentary side elevational view of a vehicle provided with a protective cover made in accordance with the principles of the invention, and which is formed completely from an elastic material;

Figure 9:
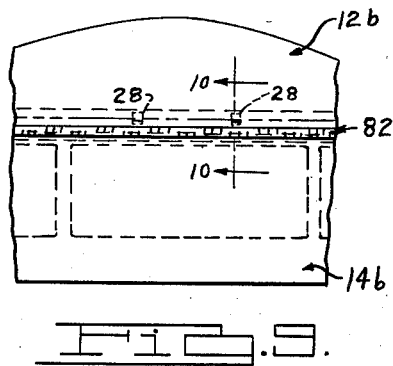
Fig. 9 is a fragmentary side elevational view of a vehicle protective cover in which the various parts are detachably connected by means of a zipper.

Before explaining in detail the present invention, it is to be understood, that the invention is not limited in its application to the details of construction and arrangement of parts illustrated in the accompanying drawings, since the invention is capable of other embodiments and of being practiced or carried out in various ways. Also, it is to be understood, that the phraseology and terminology employed herein is for the purpose of description and not limitation.

In the drawings, the numeral 10 designates a vehicle provided with a protective cover made in accordance with the principles of the invention. The protective cover includes an upper or first part 12, and a detachably connected lower or second part 14. The upper part 12 is adapted to be detachably mounted directly on the outer surface of the top 16 of the vehicle 10. Both the upper cover part 12 and the lower cover part 14 are adapted to be made from any suitable flexible, light-weight material, such as a plastic material, canvas, and the like, and, said material may be colored, transparent or opaque.

The upper portion 12 covers the entire top of the vehicle and extends down a slight distance on the sides of the vehicle below the rain gutter 18 and below the upper edge of the windshield and rear window. This upper portion is adapted to be attached to the lower cover portion 14 by any suitable means, as by snap members 20. It is to be understood, that the upper portion 12 may be used separately without the lower portion 14.

The upper cover portion 12 is provided with a peripheral strip 22 on the inner side thereof, which may be affixed to the upper cover 12 by any suitable means, as by having the upper edge thereof connected by stitches 23, if the top is made from canvas. As shown in Fig. 3, the lower edge is folded inwardly on itself, as indicated at 25, to provide a channel in which is mounted a cord 24. This cord extends from a point adjacent one side of the windshield, as indicated at the point 26, and around the sides and rear portion cover to the opposite side of the vehicle at a similar point adjacent the other side of the windshield. A piece of elastic, as 27, is secured to the front edge of the strip 22 and extends from one side of the windshield at the point 26, around the windshield to the other side 26. The cord 24 will fit under the chrome on the rear window of the vehicle and be pulled into snug engagement therewith, due to the tension exerted thereon by the elastic 27. It will be seen that the cover top portion 12 is thus held on the top of the vehicle by the co-action of the elastic strip 27 and the encircling cord 24. The top cover part is further secured on the vehicle by means of a plurality of hooks 31 which are disposed around the sides and rear portion of the cover, and, which are adapted to engage the rain gutter 18 and the chrome on the upper edge of the rear window, to hold said top part in place. As shown in Figs. 1 and 3, the hooks 31 are suitably attached to a strip of elastic 28 which passes through an aperture 30 in the peripheral strip 22. The elastic strips 28 may be affixed to the upper part 12 by any suitable means, as by the stitches 29, if the cover is made of canvas. The hooks 31 are preferably rubber-coated to prevent marring of the paint finish on the vehicle. It will be seen, that the peripheral strip 22 extends downwardly a distance sufficient to engage the snaps 20, to prevent them from marring the paint surface of the vehicle.

As shown in Fig. 1, the upper cover part 12 is provided with a centrally disposed extensible portion, generally indicated by the numeral 32, whereby, the upper cover portion may be extended longitudinally, as desired, so that it may be adapted for different length vehicles. As is shown in Fig. 2, the extensible portion 32 is formed by providing a transverse strip in the upper cover part 12, in which is mounted a plurality of one part of a snap button means, as 33, 35 and 37. The cover is then folded over such transverse area, and, a plurality of transversely aligned mating snap means 38 is provided in such folded-over portion, whereby, the length of the upper cover part 12 may be increased or decreased by snapping the aligned members 38 on either the snap parts 33, 35 or 37, as desired.

In Fig. 4, an upper cover part 12a is shown, which includes a transverse extensible portion 32a for increasing the length of the cover, and, a similar longitudinally disposed extensible portion 39 for increasing the width of the upper cover part so that the cover may be used for vehicles of varying lengths and widths. The extensible portion 39 would be formed with a plurality of snaps 40 in the same manner as described hereinbefore for the extensible portion 32. The cover lower portion 14 comprises a front windshield portion 41, two side portions 42, and one rear window portion 43. The windshield cover portion would extend from one side of the windshield, as indicated by the numeral 44, around to the other side of the windshield to a similarly located point. The windshield cover portion would extend upwardly under the upper cover part 12 to a point generally indicated by the dotted line 45. The lower edge of the windshield portion 41 may be provided with elastic bands, as 46, which may be snapped around the windshield wipers 47, so as to hold down the lower edge of said portion.

Figure 11:
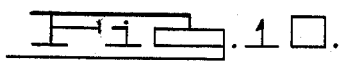
Fig. 11 is a fragmentary elevational sectional view of the structure illustrated in Fig. 1, taken along the line 11—11 thereof.

As shown in Fig. 11, the windshield cover portion 41 is preferably formed with a front wall section 48 and a back wall section 49 between which is disposed an insulating piece of material, as 50, which may be made from plastic, fiber board, cardboard, and the like. The lower edges of the wall sections 48 and 49 may be joined in any suitable manner, as by stitching them together as at 51, if the windshield portion is made from canvas. The insulating material 50 functions to prevent frost from forming on the windshield 52 and may be made in two portions, with one portion being placed on one side of the windshield and the other on the other side of the windshield. As shown in Fig. 1, each insulating board 50 would terminate along the edges of the windshield, as at 54, and near the center of the windshield, as at 56. The lower and upper edges of the insulating board 50 are indicated by the numerals 53 and 55. The windshield portion 41 may be provided with a vertically disposed extensible portion 57, which is formed in the same manner as the extensible portion 32 in the cover top part 12. The numeral 58 indicates snap members similar to those used in the extensible portion 32.

Each of the side portions 42 would extend under the edges 44 of the windshield portion to a point indicated by the numeral 60. The over-lapping edges of the side part 42 and the windshield portions 41 would be connected by any suitable means, as by the snaps 59 which would be similar to the snap members 20. The side cover portions 42 would extend upwardly under the upper cover portion 12, to a point generally indicated by the numeral 61. The rear edges of the side cover portions 42 would extend to a point as indicated by the numeral 62, so as to over-lap the side edges of the rear cover portion 43 and be suitably connected thereto by the snaps 59a. The lower edge of the side cover portions 42 are provided with elastic bands, as 63, which are adapted to be passed under the door handles 64 to hold said lower edges down.

Each of the side portions 42 is provided with a vertically disposed extensible portion 65 which is provided with suitable snap buttons 66. The extensible portion 65 is formed in the same manner as the extensible portion 32 in the upper cover part 12. The rear cover portion 43 extends under the side cover portions 42 to the point generally indicated by the numeral 67, and upwardly under the upper cover portion 12 to the point generally indicated by the numeral 68. The lower edge of the rear cover portion 43 is provided with an elastic band 69 which may be extended down and back of the vehicle and passed around a vertical portion on the rear bumper to hold said edge down. As shown in Fig. 1, the rear cover portion is provided with a vertically disposed extensible portion 70 provided with snap button members 71. The extensible portion 70 is formed in the same manner as the extensible portion 32.

In the use of the invention, the top portion 12 may be easily applied to the top of the vehicle and secured thereon in a minimum of time. The windshield portion, the side portions, and the rear window portion may be quickly connected to the upper portion, by means of the snap button members. The vehicle protective cover illustrated may be used on vehicles of varying lengths and widths because of the extensible portions 32, 57, 65 and 70. It will be understood, that the cord 24 may be made from an elastic material, and, that the windshield and rear window portions, 41 and 43, respectively, may each be formed from a plurality of parts, if desired. Furthermore, the entire lower cover part 14 may be formed as a one-piece part, if desired, rather than a multi-part cover. Instead of the snap-button members 20, other suitable fastening means may be used, as, for example, hook-eye fasteners.

Figure 5 illustrates another means for providing the vehicle protective cover with an extensible section. The numeral 72 designates a fragmentary portion of a cover upper part provided with a transverse extensible section 73 which is formed by gathering a transverse portion of the cover, and holding such gathered portion in this position by means of a plurality of longitudinally disposed strips of elastic material, as 74. The numeral 75 indicates the folds of the gathered cover material. A vehicle protective cover upper part formed with transverse and longitudinal extensible sections as 73, may be used on vehicles of varying lengths by merely stretching the cover upper part to the desired width and length. The cover lower portions 41, 42 and 43 may also be provided with extensible portions similar to the extensible portions 73.

Fig. 6 illustrates still another means for providing the vehicle cover with an extensible section. The numeral 76 designates a fragmentary portion of a cover upper part provided with a transverse extensible section 77 which is formed completely from an elastic material. A vehicle protective cover upper part formed with a transverse elastic section as 77, may be used on vehicles of varying lengths by merely stretching the cover upper part to the desired length and the extensible elastic section 77 will provide for any extra needed length. A cover upper part so formed may also be provided with a similar longitudinally disposed elastic section as 77, so that the cover may be widened, as desired. The lower cover portions 41, 42 and 43 may be provided with elastic sections as 77, to permit said portions to be used on vehicles of varying lengths.

Fig. 7 illustrates a further means for providing the vehicle protective cover with an extensible section. The numeral 78 designates a fragmentary portion of a cover upper part provided with a transverse extensible section 79 which is formed by gathering a transverse portion of the cover and holding such gathered portion in this position by means of a plurality of longitudinally disposed adjustable-length zippers 80. The zippers 80 may be of the type usually employed on maternity dresses. The numeral 81 indicates the folds of the gathered cover material. The vehicle cover upper part may also be provided with a longitudinally disposed extensible section as 79, whereby, the cover upper part may be used on vehicles of varying lengths and widths.

Fig. 8 illustrates a further embodiment of the invention in which the vehicle protective cover is made completely from any suitable elastic material. The numeral 83 indicates the cover upper part. The numerals 84, 85 and 86 indicate the windshield, side, and rear window portions, respectively, of the cover lower part. The aforementioned cover lower portions would be detachably connected together and to the cover upper part 83 by any suitable means, as by the snap members designated by the numeral 87. The embodiment of Fig. 8 may be used on vehicles of varying sizes by merely stretching the cover to the desired width and length.

Figure 10:
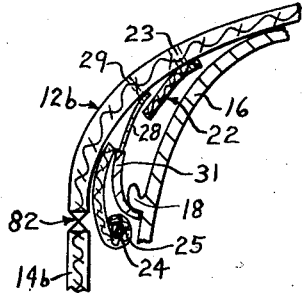
Fig. 10 is a fragmentary elevational sectional view of the structure illustrated in Fig. 9, taken along the line 10—10 thereof.

Figs. 9 and 10 illustrate another means for detachably connecting the cover upper part 12 to the cover lower part 14. Instead of the snap members 20, shown in the embodiment of Fig. 1, the cover parts illustrated in Figs. 9 and 10 are detachably connected by a suitable zipper means generally indicated by the numeral 82. The rest of th ecover structure of this embodiment would be the same as illustrated in the embodiment of Fig. 1.

Figure 12:
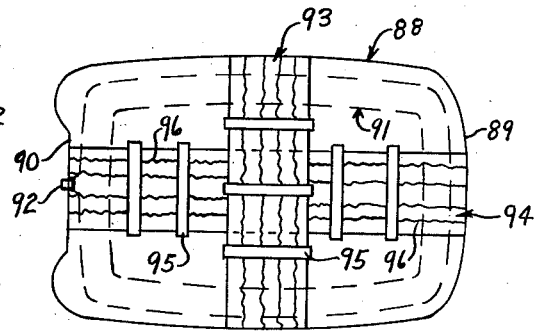
Fig. 12 is a top plan view of a modified top part of a vehicle protective cover made in accordance with the principles of the invention.

Fig. 12 illustrates another embodiment of a cover upper part which is provided with a fluid storage compartment and with both transverse and longitudinally disposed extensible sections, whereby, it may be used on vehicles of varying widths and lengths. This cover upper part would be attached by the usual snap-button or zipper means to the lower cover part illustrated in Fig. 1. The numeral 88 generally designates the cover upper part, and the numerals 89 and 90 indicate, respectively, the front and rear ends of the cover part. The numeral 91 indicates a peripherally disposed fluid storage compartment which has an outlet indicated by the numeral 92. The transverse and longitudinally disposed extensible sections 93 and 94, respectively, would be formed by gathering portions of the cover and holding such gathered portions in this position by means of a plurality of elastic strips, as 95. The numeral 96 indicates the folds of the gathered material. If the cover part 88 is made from an upper and lower layer of material, then each layer would be provided with such aforedescribed transverse and longitudinal sections.

Figure 13:
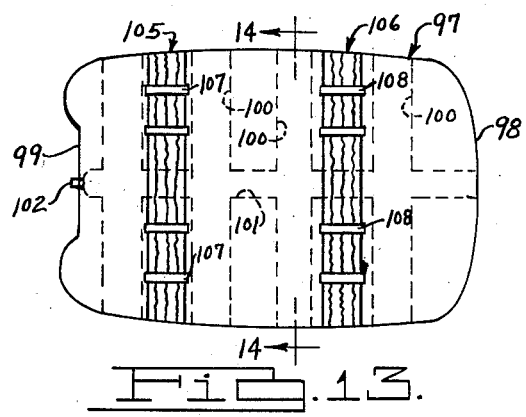
Fig. 13 is a top plan view of a further modified top part of a vehicle protective cover made in accordance with the principles of the invention; and, Fig. 14 is an elevational sectional view of the structure illustrated in Fig. 13, taken along the line 14—14 thereof.
Figure 14:
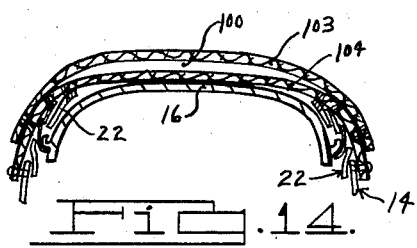

Figs. 13 and 14 illustrate another embodiment 97 of a cover upper part adapted for use with the cover lower portions illustrated in Fig. 1. The numerals 98 and 99 indicate the front and rear ends of the cover part, respectively. The cover upper part 97 is provided with a plurality of transversely disposed fluid storage compartments 100 which are connected to a longitudinally disposed fluid compartment 101. The fluid storage compartments are provided with an outlet generally indicated by the numeral 102. The cover upper part 97 is provided with a plurality of transversely disposed extensible portions 105 and 106 which are formed in the same manner as the extensible portions 93 and 94, in the embodiment of Fig. 12. The numerals 107 and 108 generally indicate the strips of elastic material which function to hold the folds of gathered material. The cover part 97 may also be provided with a longitudinally disposed extensible section similar to the extensible section 94 of Fig. 12. The cover part 97 is preferably formed from an upper layer of material 103 which is joined to a lower layer 104 by any suitable means, as by stitching, if the cover part is made of canvas.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A vehicle protective cover, comprising: a roof cover part made from a pliable material and being formed to cover the roof of the vehicle; said roof cover part being provided with at least one transverse portion which is extensible; said roof cover part being adapted to fit directly on the roof of the vehicle; means on said roof cover part for detachably fastening the cover part on the vehicle; a window cover part made from a pliable material and being formed to cover the window areas of the vehicle; and, means for detachably connecting said window cover part to said roof cover part.

2. The invention as set forth in claim 1, wherein: said window cover part is provided with at least one vertically disposed extensible portion.

3. The invention as set forth in claim 1, wherein: said roof cover part is provided with a plurality of fluid storage pockets therein.

4. The invention as set forth in claim 2, wherein: said extensible portions are formed by providing a plurality of snap retainer members in one portion of the cover parts and folding over an adjacent portion of said parts and providing said folded over portion with mating snap retainer members, whereby, the snap retainer members on the folded-over section may be selectively attached to any group of snap retainer members in said first mentioned group of snap retainer members.

5. The invention as set forth in claim 2, wherein: said extensible portions are formed by gathering a portion of the cover parts into folds and securing a plurality of elastic strips over said gathered folds.

6. The invention as set forth in claim 2, wherein: the extensible portions of said cover parts are completely formed from an elastic material.

7. The invention as set forth in claim 2, wherein: said extensible portions are formed by gathering a portion of the cover parts into a plurality of folds and fixedly mounting an extensible zipper across said folds.

8. The invention as set forth in claim 2, wherein: said window cover part comprises a plurality of parts.

9. The invention as set forth in claim 2, wherein: said window cover part is detachably mounted to the roof cover part by means of a plurality of snap retainer members.

10. The invention as set forth in claim 2, wherein: said window cover part is detachably connected to said roof cover part by means of a zipper device.

11. The invention as set forth in claim 2, wherein: said window cover part comprises a windshield portion, a pair of side window portions, and a rear window portion; said window cover portions being detachably connected together; and, means for retaining the lower edges of the window cover part in place.

12. The invention as set forth in claim 11, wherein:

said windshield portion comprises an inner and outer wall; and, an insulating board being mounted between the wall of said windshield cover portion.

13. The invention as set forth in claim 2, wherein; said roof cover portion is provided with a protective strip of material which is mounted on the inner side of the periphery of the roof cover part and which extends downwardly to form a protective shield between the body of the vehicle and the inner sides of the means for connecting the roof cover part to the window part, so as to prevent marring of the paint on the vehicle.

14. The invention as set forth in claim 13, wherein: said peripheral protective strip on the inner side of the roof cover part is provided with a cord fixedly mounted on the lower edge thereof for a portion of the periphery thereof; and, an elastic strip being fixedly mounted around the front edge of the roof cover part.

15. A vehicle protective cover comprising: a roof cover part made from a pliable material, and being formed to cover the roof of the vehicle; said cover part being provided with at least one portion which is extensible, whereby said part may be used for vehicles having different sizes of roofs; said cover part being adapted to fit directly on the roof of the vehicle; means on said cover part for detachably fastening the cover part on the vehicle; and, said cover part being provided with transversely disposed and longitudinally disposed extensible portions.

16. A vehicle protective cover comprising: a roof cover part made from a pliable material, and being formed to cover the roof of the vehicle; said cover part being provided with at least one portion which is extensible, whereby said part may be used for vehicles having different sizes of roofs; said cover part being adapted to fit directly on the roof of the vehicle; means on said cover part for detachably fastening the cover part on the vehicle; said cover part being provided with transversely disposed and longitudinally disposed extensible portions; and, said cover part being provided with means for detachably fastening thereto a second cover part for covering the window areas on the vehicle.

References Cited in the file of this patent

UNITED STATES PATENTS

| | | |
|---|---|---|
| 2,608,942 | Smith | Sept. 2, 1952 |
| 2,718,912 | Zimmerman | Sept. 27, 1955 |